(12) United States Patent
Scales et al.

(10) Patent No.: US 7,895,662 B1
(45) Date of Patent: Feb. 22, 2011

(54) SYSTEMS AND METHODS FOR THE REMOTE DELETION OF PRE-FLAGGED DATA

(75) Inventors: Glen William Scales, Cedar Park, TX (US); James Elliott, Douglasville, GA (US); Jonathan Norton, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1062 days.

(21) Appl. No.: 11/609,647

(22) Filed: Dec. 12, 2006

(51) Int. Cl.
*G06F 7/04* (2006.01)
(52) U.S. Cl. ......................................... 726/27; 726/1
(58) Field of Classification Search .................. 726/27, 726/1
See application file for complete search history.

(56) References Cited

U.S. PATENT DOCUMENTS

2006/0148529 A1* 7/2006 Yoon et al. ................ 455/566
2006/0277590 A1* 12/2006 Limont et al. ................ 726/1

* cited by examiner

*Primary Examiner*—Thanhnga B Truong
*Assistant Examiner*—Angela Holmes
(74) *Attorney, Agent, or Firm*—Parks IP Law LLC; Mickki D. Murray, Esq.

(57) ABSTRACT

Disclosed herein is a method for the secure deletion of data stored within a data processing system. The method includes the steps of executing a flag routine, wherein data is flagged for possible future deletion; executing an authorization routine to authorize the deletion of the flagged data; and receiving a deletion trigger, the deletion trigger initiating the execution of a data deletion routine to delete the flagged data. An exemplary data processing system configured to delete the flagged data is also provided.

18 Claims, 8 Drawing Sheets

SYSTEMS AND METHODS FOR THE REMOTE DELETION OF PRE-FLAGGED DATA

TECHNICAL FIELD

The present invention relates generally to data security and, more particularly, to the remote deletion of data.

BACKGROUND OF THE INVENTION

Today, consumers spend billions of dollars every year on consumer electronics such as laptop computers, notebook computers, tablet computers, mobile telephones, Personal Digital Assistants (PDAs), and other mobile devices such as personal media players. Often, these devices enable users to create, save, and share personal data such as digital photographs, music, and videos. Other private data such as financial records, credit card numbers, Personal Identification Numbers (PINs), and online passwords are also often stored on these devices with little or no security mechanisms to prevent fraudulent activity. Moreover, unsecured Internet connections, most notably many Wireless Fidelity (Wi-Fi) hotspots and negligent home Wi-Fi networks, provide hackers with easy access to this data directly from the device in question, or during transmission of the proprietary data (e.g., during an e-commerce transaction). The portability of these devices only further increases the likelihood of the device and thus the proprietary data being lost, stolen, or otherwise compromised and potentially used for fraudulent purposes.

Businesses are also susceptible to the abovementioned threats, perhaps on a much larger scale. Businesses are also more inclined to adopt technologies such as hardware and/or software to prevent or aid in preventing their data from becoming comprised. That is, though, often not the case with many employees, unknowingly or otherwise, aiding to proprietary data being compromised.

Thus, what are needed in the art are devices, systems, and methods for the secure deletion of proprietary data in the event the data is compromised.

SUMMARY OF THE INVENTION

The various embodiments of the present invention overcome the shortcomings of the prior art by providing systems and methods to securely and remotely delete pre-flagged data. A method for the secure deletion of data stored within a data processing system is provided herein. In one embodiment, this method includes a first step of executing a flag routine, wherein the flag routine is configured to flag at least one datum for possible future deletion. The method also includes the steps of executing an authorization routine and receiving a deletion trigger, wherein the deletion trigger initiates the execution of a data deletion routine to delete the flagged data. The authorization routine is configured to provide at least one means for authentication to authorize the remote deletion of the data.

The flag routine can include at least one key press to flag the data. In an alternative embodiment of the flag routine, the data is saved to a memory that is specifically configured to store flagged data in accordance with a data deletion routine. In another alternative embodiment of the flag routine, the data is saved as a file type. In yet another alternative embodiment of the flag routine, the data is stored in a folder configured to contain data for deletion.

The data deletion routine can delete the data prior to an operating system load sequence. In another embodiment, the data deletion routine is configured to delete the data during an operating system load sequence. In a further embodiment, the data deletion routine is configured to delete the data after an operating system load sequence.

A data processing system configured for the secure deletion of data is also provided. The data processing system includes a processor configured to execute instructions corresponding to a flag routine, such as the abovementioned flag routines, and to execute instructions corresponding to a data deletion routine, such as the abovementioned data deletion routines. The data processing system further includes a memory that is in communication with the processor. The memory is configured to store at least one flagged datum. The data processing system still further includes a transceiver. The transceiver is configured to receive a signal to trigger the execution of a data deletion routine.

A method for authenticating a user for the secure deletion of data stored within a data processing system is also provided. The method includes the steps of receiving a first set of authentication data at a data processing system; comparing the first set of authentication data to a second set of authentication data; and authorizing the deletion of at least one flagged datum stored within the data processing system if, in the step of comparing, the first set of authentication data is substantially similar to the second set of authentication data. The first and second sets of authentication data can include at least one means for identification.

In some embodiments, the method further includes the step of first receiving the first set of authentication data at an authorization center. The authorization can be configured to compare the first set of authentication data with a third set of authentication data, wherein the third set of authentication data includes at least one means for identification.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
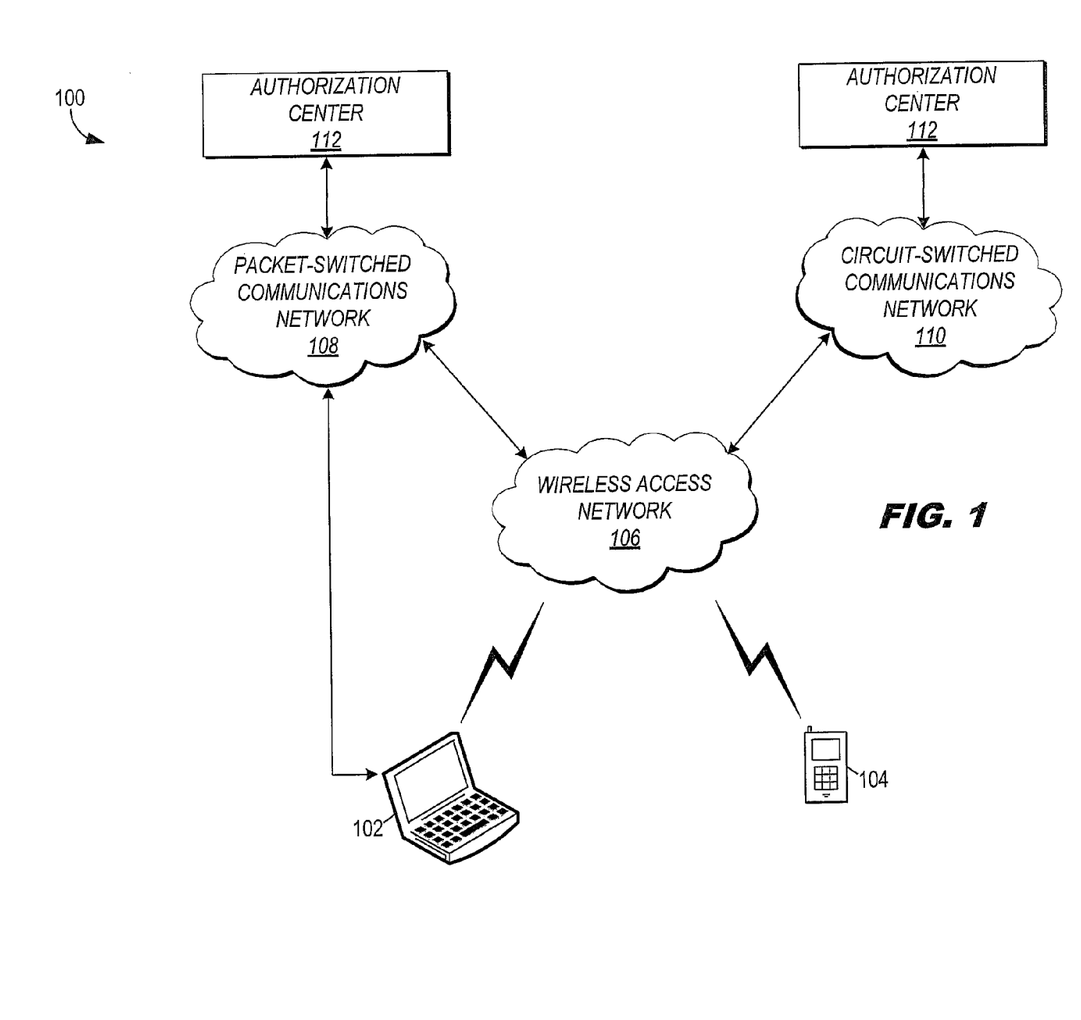
FIG. 1 illustrates an exemplary communications system, in accordance with an embodiment of the present invention.

Referring now to the drawing in which like numerals represent like elements throughout the several views, FIG. 1 illustrates an exemplary communications system 100 for implementing various aspects of the present invention. In general, the present invention allows a user to remotely delete pre-flagged data from a data processing system (DPS); for example, a laptop computer 102 or a mobile communications device 104. It is contemplated, however, that other DPSs may be used such as, but not limited to, a desktop computer, a notebook computer, a tablet computer, a personal digital assistant (PDA), a mobile handset, a server, an Internet appliance, and any other type of data processing system. As used herein, data includes raw data, formatted data, metadata, files, logical groups of files (e.g., folders), and other information capable of being stored in a memory of a DPS.

The illustrated laptop computer 102 is in communication with both a wireless access network 106 and a packet-switched communications network 108 (e.g., the Internet). The illustrated mobile communications device 104 is in communication with the wireless access network 106. In alternative embodiments, a DPS can be in communication with a circuit-switched communications network 110 (e.g., the public switched telephone network (PSTN)) and/or one or more of the abovementioned networks.

In general, the wireless access network 106 provides a means for wireless communication for the laptop computer 102 and the mobile communications device 104. As used herein, means for wireless communication includes any wireless access technologies such as, but not limited to, Frequency Division Multiple Access (FDMA), Time Division Multiple Access (TDMA), Global System for Mobile Communication (GSM), Code Division Multiple Access (CDMA), CDMA2000, Universal Mobile Telecommunications System (UMTS), Wireless Fidelity (Wi-Fi), Wireless Interoperability for Microwave Access (Wi-Max), or any combination, derivative service, or improvement thereof, and the like.

The illustrated communications system 100 further includes an authorization center 112. The authorization center 112 is provided, in one embodiment, to authorize a user to remotely delete pre-flagged data from a DPS. In one embodiment, the authorization center 112 is provided as a call center. In another embodiment, the authorization center 112 is provided as a website. The authorization center 112 is described in more detail with reference with to FIG. 5.

Figure 2:
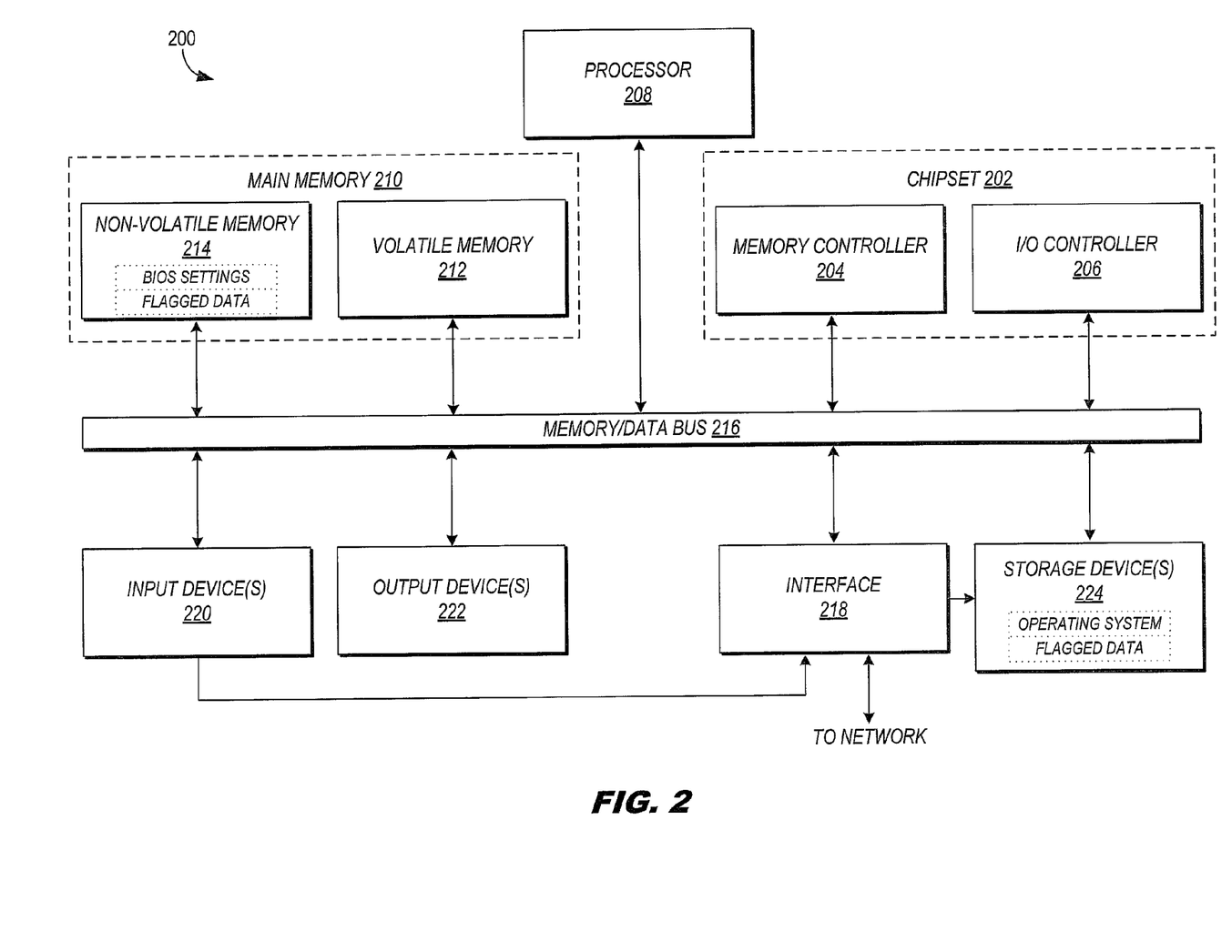
FIG. 2 illustrates an exemplary data processing system, in accordance with an embodiment of the present invention.

Referring now to FIG. 2, the internal components of an exemplary DPS 200 are illustrated. The illustrated DPS 200 includes a chipset 202, which includes a memory controller 204 and an input/output (I/O) controller 206. As is known in the art, a chipset typically provides memory and I/O management functions, as well as a plurality of general purpose and/or special purpose register, timers, and the like that are accessible or used by a processor 208.

The memory controller 204 performs functions that enable the processor 208 to access and communicate with a main memory 210 including a volatile memory 212 and a non-volatile memory 214 via a memory/data bus 216. The volatile memory 212 can be implemented by Synchronous Dynamic Random Access Memory (SDRAM), Dynamic Random Access Memory (DRAM), RAMBUS Dynamic Random Access Memory (RDRAM), and/or any other type of Random Access Memory (RAM) device. The non-volatile memory 214 can be implemented using flash memory, Read-Only Memory (ROM), Electrically Erasable Programmable Read-Only Memory (EEPROM), and/or any other desired type of memory device.

The DPS 200 also includes an interface circuit 218 that is operatively linked to the memory/data bus 216. The interface circuit 218 can be implemented using any type of known interface standard such as, but not limited to, Ethernet interface, modem interface, Bluetooth interface, serial interface, parallel interface, Universal Serial Bus (USB) interface, Institute of Electrical and Electronics Engineers (IEEE) 1394 Firewire, AT Attachment (ATA) interface, IEEE 802.x interfaces, other radio frequency interfaces, any combination thereof, derivative thereof, or improvement thereof, and the like.

One or more input devices 220 are in communication with the interface circuit 218. The input device(s) 220 permit a user to enter data and commands into the processor 208. For example, the input device(s) 220 can be implemented by a keyboard, a mouse, a touch-sensitive display, a track pad, a track ball, a pointer, a voice recognition system, or other desired input device.

One or more output devices 222 are also in communication with the interface circuit 218. For example, the output device(s) 222 can be implemented by display devices (e.g., a light emitting diode (LED) display, a liquid crystal display (LCD), a cathode ray tube (CRT) display, and/or a plasma display), a printer, a plotter, or other desired output device.

The DPS 200 also includes one or more storage devices 224 configured to store, for example, operating system software and pre-flagged data. Examples of such storage device(s) 224 include floppy disks and drives, hard disk drives, compact disks and drives, digital versatile disks (DVD) and drives, and the like. The terms memory and storage are sometime used interchangeably herein and are meant to refer to the main memory 210 and/or the storage devices 224.

The interface circuit 218 provides an interface for the storage device(s) 224. The interface circuit 218 can also facilitate the exchange of data with external DPSs via one or more of the abovementioned networks. The interface circuit 218 can include transceivers for communication via any means for wireless communication. In addition or alternatively, a transceiver can be installed in the DPS 200 for discrete communication, for example, with the authorization center 200. This transceiver may be powered via a battery or other power source to receive and/or send authorization data between the DPS 200 and the authorization center 200 unbeknownst to the thief or hacker. In another embodiment, the transceiver communicates directly with a mobile telephone, landline telephone, computer, or other communications device via the packet-switched communications network 108 and/or the circuit-switched communications network 110.

Access to the input device(s) 220, the output device(s) 222, the storage device(s) 224, and/or one or more of the abovementioned networks, is typically controlled via the I/O controller 206. In particular, the I/O controller 206 performs functions that enable the processor 208 to communicate with the input device(s) 220, output device(s) 222, and storage device(s) 224, via the memory/data bus 216 and the interface circuit 218.

While the components shown in FIG. 2 are depicted as separate functional blocks within the DPS 200, the functions performed by some of these blocks may be integrated within a single semiconductor circuit or, alternatively, may be implemented using two or more separate integrated circuits. For example, although the memory controller 204 and the I/O controller 206 are depicted as separate function blocks within the chipset 202, persons of ordinary skill in the art will readily appreciate that the memory controller 204 and the I/O controller 206 may be integrated within a single semiconductor circuit.

It should be understood that, in some implementations, certain DPSs may in varying quantities and/or types of components than those illustrated and described with reference to FIG. 2.

Figure 3:
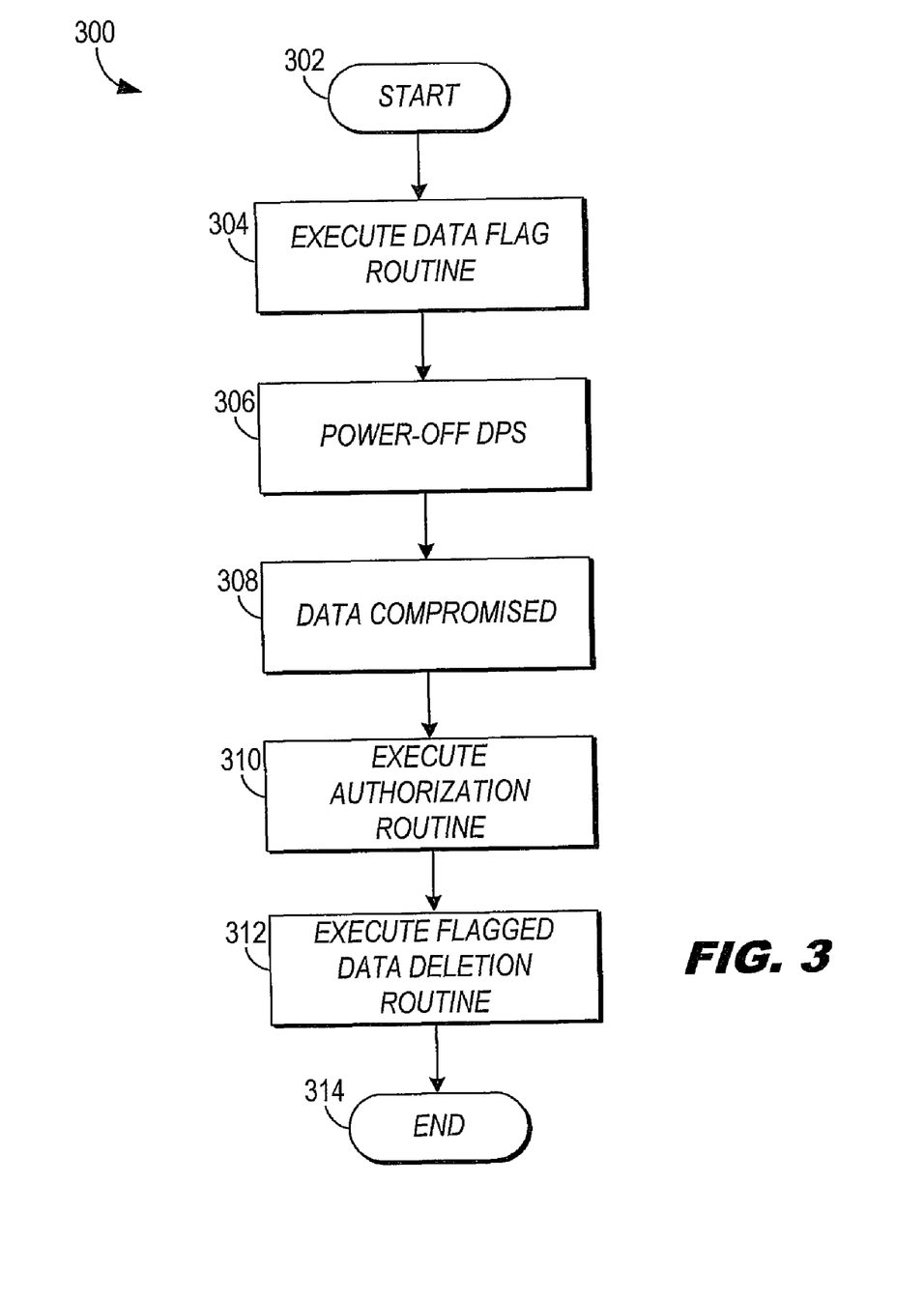
FIG. 3 illustrates a flow diagram of an exemplary method, in accordance with an embodiment of the present invention.

Referring now to FIG. 3, a flow diagram of an exemplary method 300 is illustrated, according to the present invention. The exemplary method 300 begins at step 302 and proceeds to step 304, wherein a data flag routine is executed.

Figure 4:
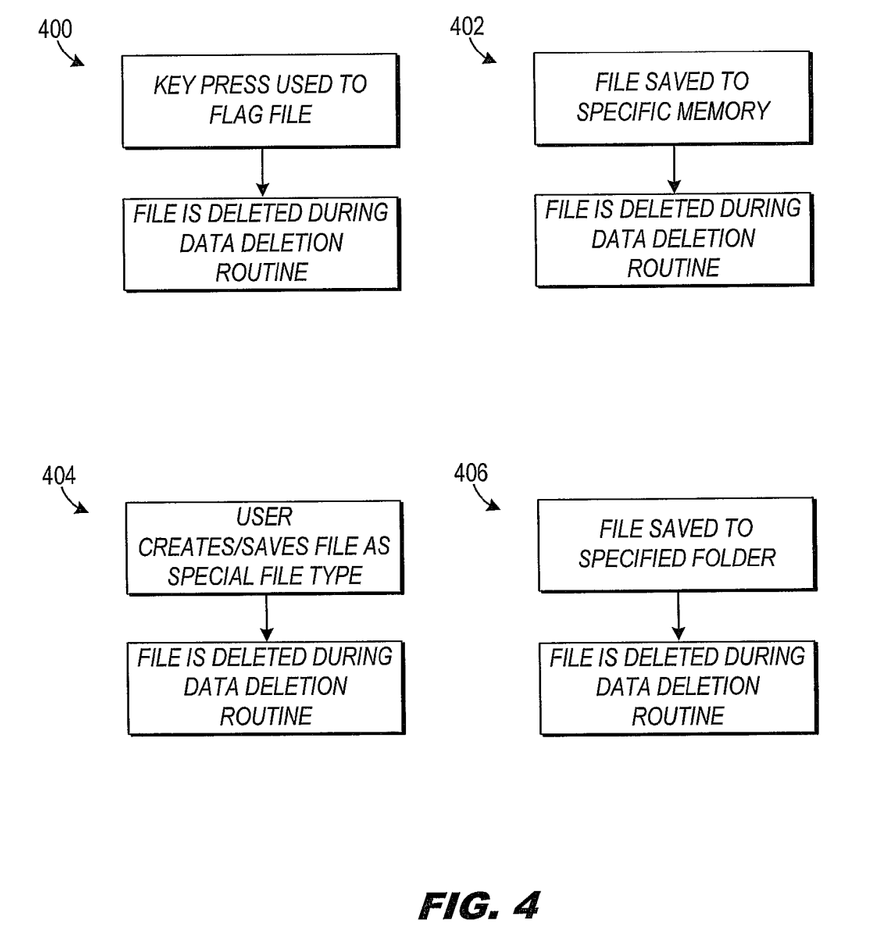
FIG. 4 illustrates data flag routines, in accordance with various embodiments of the present invention.

Referring briefly to FIG. 4, exemplary data flag routines are illustrated in accordance with several embodiments of the present invention. In general a flag routine is used to flag data for possible future deletion, for example, if the data is compromised. In one embodiment, as referenced by routine 400, a key press or key sequence press is used to flag one or more files for possible deletion. For example, a user can highlight a file or open a file, at which time the user can press an assigned key or key sequence to automatically flag the file for possible future deletion. An indication (e.g., a file property) can then be used to indicate the file is to be deleted upon execution of a data deletion routine.

In another embodiment, as referenced by routine 402, a file is flagged by saving the file to a specific memory. The memory can be any memory device 210 type or storage device 224 type described previously with reference to FIG. 2. In some embodiments, the file is stored in a memory 210, portion of a memory 210, storage device 224, or portion of a storage device 224. In alternative embodiments, the file is stored in a dedicated memory 210 such as a CMOS memory, other volatile memory, non-volatile memory, and the like.

In yet another embodiment, as referenced by routine 404, a user can create or save a file as a special file type that is known by the DPS 200 and any associated file system and/or software to be flagged for possible future deletion. Accordingly, software can be programmed to offer these additional file types.

In still another embodiment as referenced by routine 406, a user can save files to a specific folder. The folder would be flagged so as to designate it as containing files or other data that is subject to future deletion. Folder settings or properties can be configured to provide such an indication.

Regardless of the flag routine used, the data is flagged for deletion upon execution of a data deletion routine. Several exemplary embodiments of data deletion routines are described in detail with reference to FIGS. 6-8.

Referring back to FIG. 3 and particularly to step 306, the DPS 200 is powered-off at step 306. Alternatively, the DPS 200 is not powered-off at step 306 and instead, the appropriate data deletion routine deletes any flagged data at step 312. At step 308, the data is compromised; for example, if the DPS is lost or stolen, or is subject to an attack. The method 300 then proceeds to step 310, wherein an authorization routine is executed. An exemplary authorization routine is described with reference to FIG. 5. After the authorization routine is executed, the method 300 proceeds to step 312, wherein a data deletion routine is executed. At step 314 the method ends. Several exemplary data deletion routines are described with reference to FIGS. 6-8.

Figure 5:
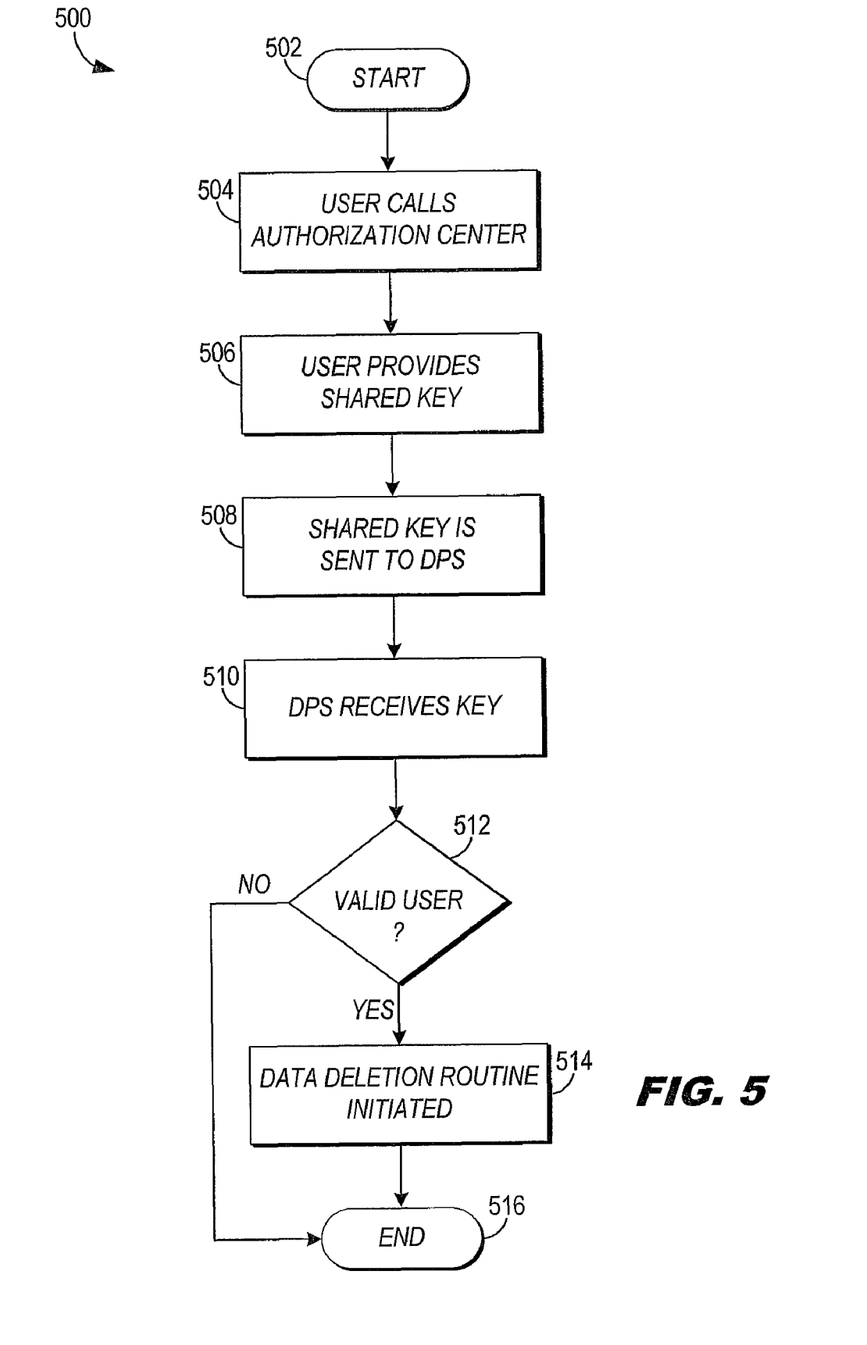
FIG. 5 illustrates a flow diagram of an exemplary authorization routine, in accordance with an embodiment of the present invention.

Referring now to FIG. 5, a flow diagram of an exemplary authorization routine 500 is illustrated, according to the present invention. The routine 500 generally describes and embodiment wherein the authorization center 112 is used as an intermediary between a user's communications device (e.g., a telephone or Internet-enabled computer) to communicate authentication data to the DPS 200. As used herein, authentication data includes any means for authentication including, but not limited to, a password, a Personal Identification Number (PIN), a pass code, a securID device, a security question, a security image, an account number, a name, an address, a telephone number, an email address, a date of birth, a credit card number, any combination and/or variations thereof, and the like.

For purposes of simplicity, a shared key authentication scheme is used to describe the exemplary authorization routine 500. In one embodiment, a key (e.g., a password) is created by a user of the DPS 200 and stored in a memory 210. A key can be sent by the authentication center 112 or directly from the user and compared to the key stored in the memory 210, after which appropriate action can be taken. In an alternative embodiment, a securID device can be operatively linked to the DPS 200. A user can have a second securID device. The current key prescribed by the securID can be sent by the authentication center 112 or directly from the user and compared to the key in the DPS 200 securID device, after which appropriate action can be taken. An exemplary authorization routine 500 is now described.

The exemplary authorization routine 500 begins at step 502 and proceeds to step 504, wherein a user calls the authorization center 112. In an alternative embodiment, a user can access a secure website that is operated by the authorization center 112. In another alternative embodiment, a user can communicate with the DPS 200 directly without first going through an intermediary such as the authorization center 112. It is contemplated that a variety of communication methods can be used for direct communication with the DPS 200, such as, but not limited to a voice call, a message, an Internet Protocol (IP) session, or the like. Authentication software stored in a memory 210 or storage device 224 can be appropriately configured to handle such communication.

The routine 500 begins at step 502 and proceeds to step 504, wherein a user calls the authorization center 112. The authorization center 112 can include hardware and/or software to facilitate authorization procedures such as a request and receipt of a key provided by the user, as illustrated in step 506.

After the key is provided to the authorization center 112 and the user has been authenticated as the owner of the shared key (e.g., via additional means for identification), the routine 500 proceeds to step 508, wherein the shared key is sent to the DPS 200. In some embodiments, the authorization center 112 can request the shared key from the DPS 200 and then compare the received key to the key submitted by the user.

At step 510, the DPS 200 receives the key and it is determined, at step 512, if the key is from a valid user. If the key is from a valid user, the routine 500 proceeds to step 514, wherein a data deletion routine is initiated. After the data deletion routine is initiated, the routine 500 ends at step 516. If it is determined, at step 512, that the key is not from a valid user, the routine 500 proceeds to step 516 and the routine 500 ends at step 516.

Figure 6:
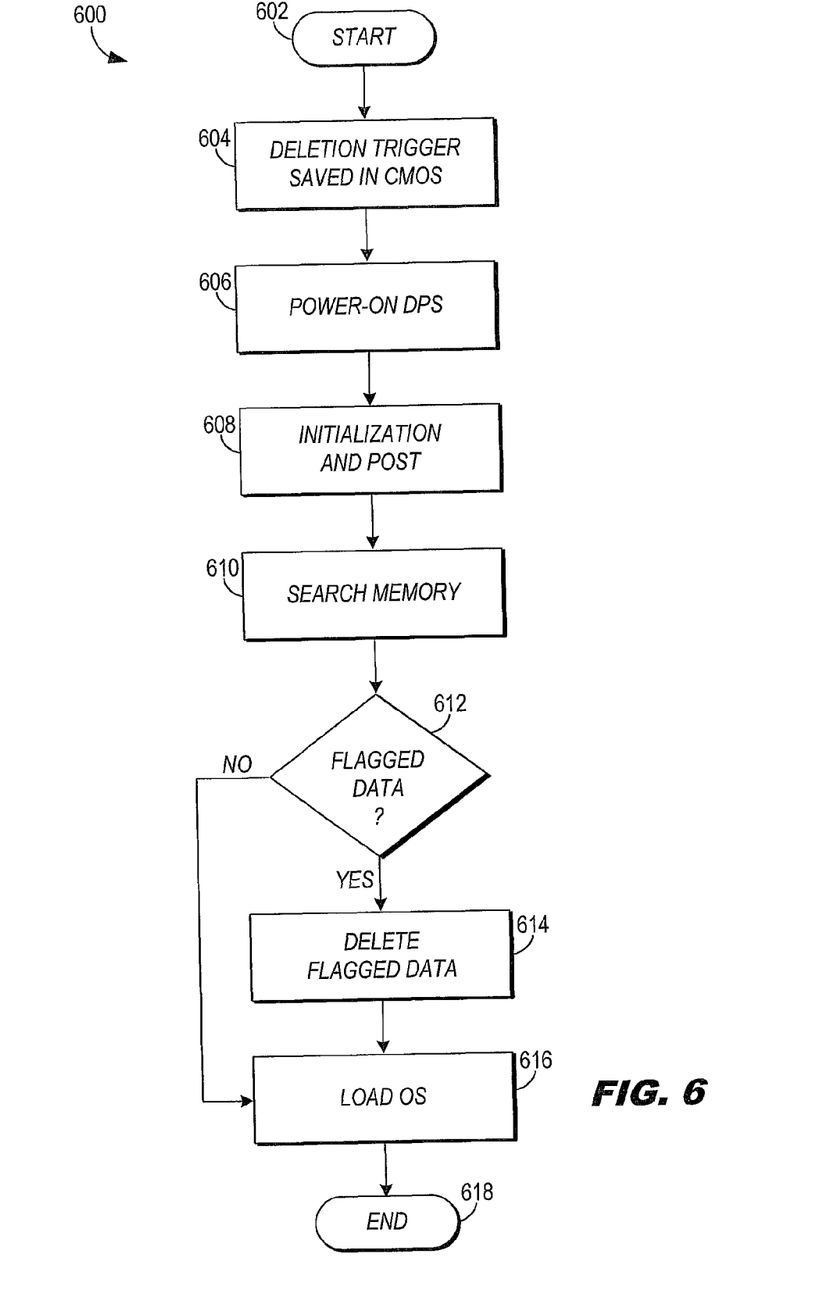
FIG. 6-FIG. 8 illustrate flow diagrams of exemplary data deletion routines, in accordance with various embodiments of the present invention.

Several exemplary data deletion routines are now described with reference to FIGS. 6-8. Referring specifically to FIG. 6, a flow diagram of a first exemplary data deletion routine 600 is illustrated. This flow diagram illustrates a system wherein data has been stored in a memory or storage device 224 and is accessible prior to an operating system being loaded.

The data deletion routine 600 begins at step 602 and proceeds to step 604, wherein a deletion trigger is saved in the Complementary Metal-Oxide Semiconductor (CMOS) memory or another memory 210 type configured to save Basic Input/Output System (BIOS) configuration settings. A setting for turning a deletion setting on and off can be encoded into the BIOS software and enabled for use when a deletion trigger is saved.

After the deletion trigger or setting is saved in the CMOS or other memory 210, the routine 600 proceeds to step 606, wherein the DPS 200 is powered-on. At step 608, the BIOS executes and performs system initialization and Power-On Self Test (POST) activities. At step 610, the memory is searched, to determine if any data is stored therein. If it is determined, at step 612, that flagged data is stored in the memory 210, the routine 600 proceeds to step 614 and the flagged data is deleted. The operating system is then loaded at step 616 and the routine 600 ends at step 618. If it is determined, at step 612, that no flagged data is stored in memory 210, then the routine 600 proceeds to step 616 and the operating system is loaded, after which the routine 600 ends at step 618.

Figure 7:
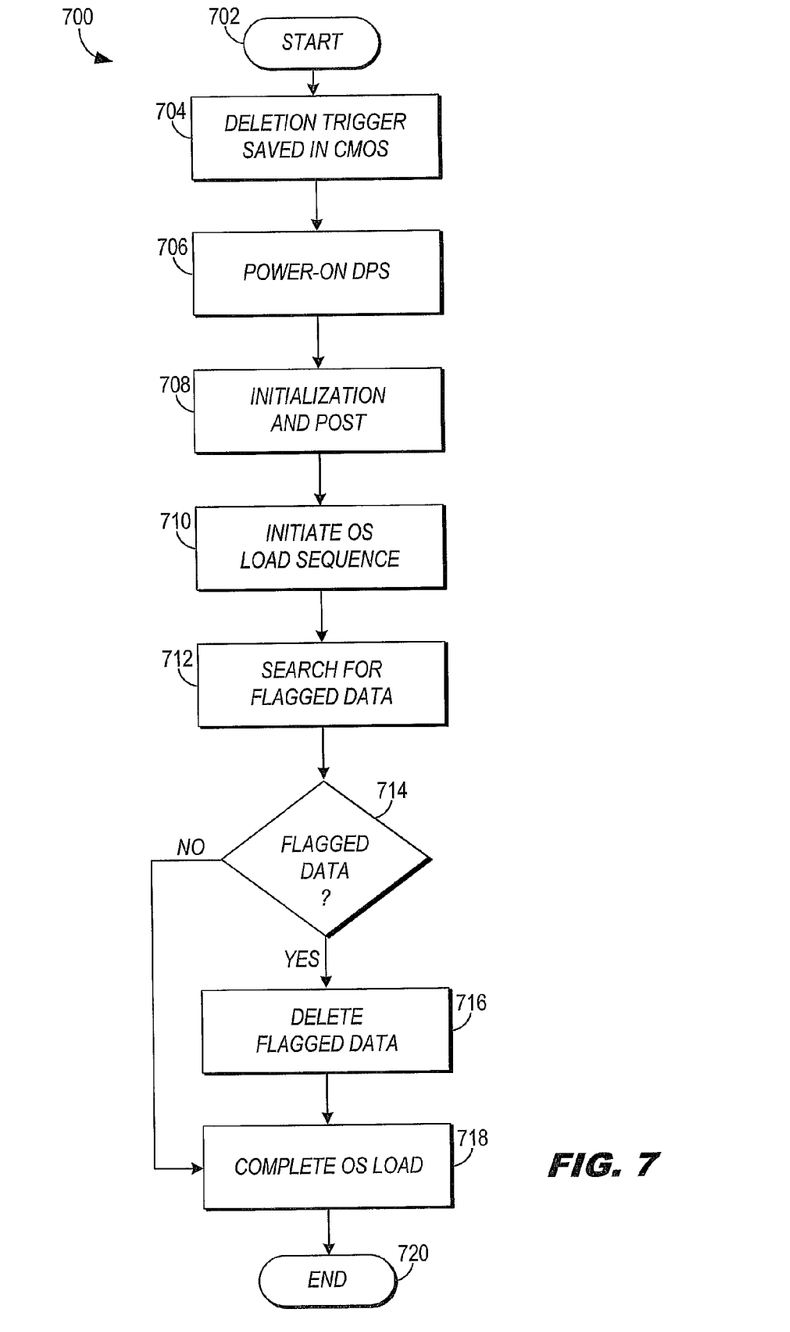

Referring now to FIG. 7, a flow diagram of a second exemplary data deletion routine 700 is illustrated. The data deletion routine 700 is directed towards data stored on a storage device, for example, a hard disk.

The data deletion routine 700 begins at step 702 and proceeds to 704, wherein a deletion trigger is saved in the CMOS memory or another memory type configured to save BIOS configuration settings. A setting for turning a deletion setting on and off can be encoded into the BIOS software and enabled for use when the DPS 200 receives a deletion trigger is saved.

After the deletion trigger or setting is saved in the CMOS or other memory, the routine 700 proceeds to step 706, wherein the DPS 200 is powered-on. At step 708, the BIOS executes and performs system initialization and Power-On Self Test (POST) activities. At step 710, an operating system load sequence is initiated during which a search for flagged data can be performed as indicated by step 712. The routine 700 then proceeds to step 714, wherein it is determined if flagged data is available for deletion. If it is determined, at step 714, that flagged data is available, the routine 700 proceeds to step 716 and the data is deleted. The operating system load sequence is completed at step 718 and the routine 700 ends at step 720.

If it is determined, at step 714, that no flagged data is available for deletion, then the routine 700 proceeds to step 718 and the operating system load sequence is completed, after which the routine 700 ends at step 720.

Figure 8:
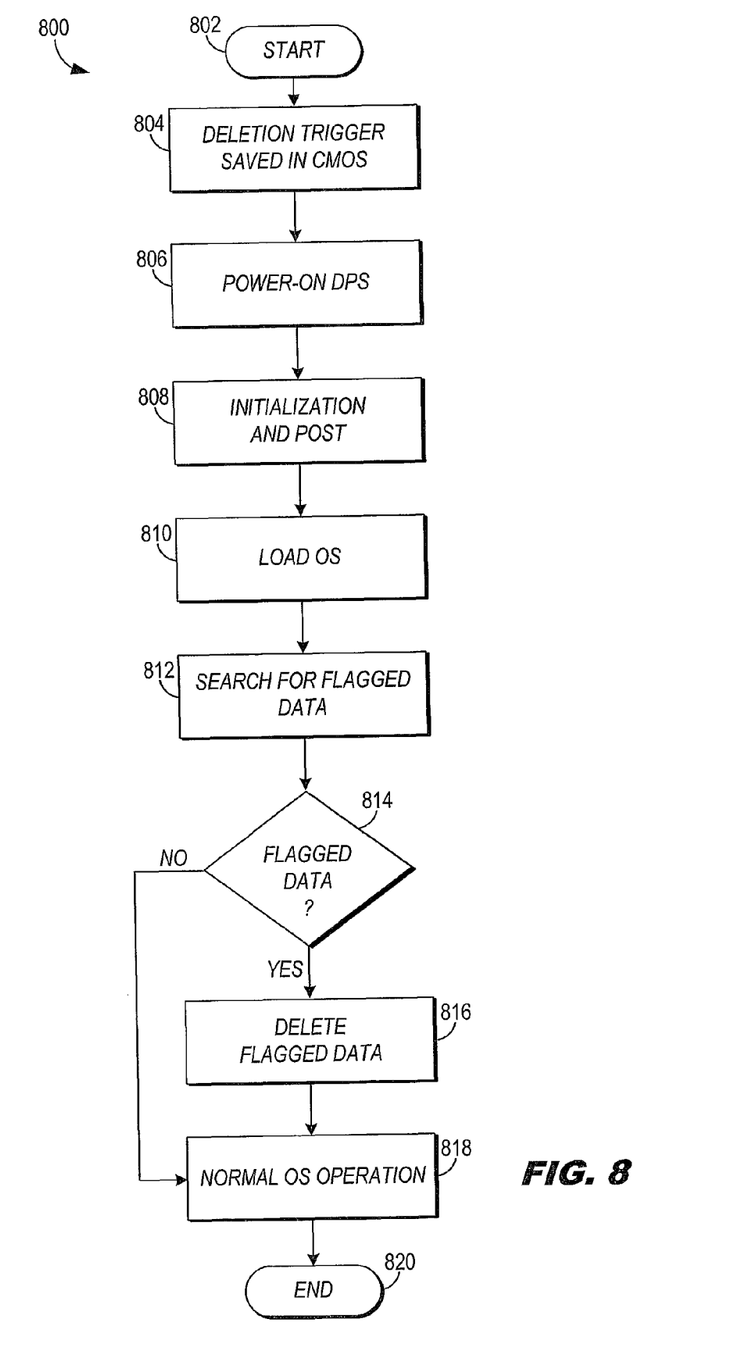

Referring now to FIG. 8, a flow diagram of a data deletion routine is illustrated. The illustrated data deletion routine allows flagged data to be deleted after the operating system is loaded. The data deletion routine 800 begins at step 802 and proceeds to step 804, wherein a deletion trigger is saved in the CMOS memory or another memory type configured to save BIOS configuration settings. A setting for turning a deletion setting on and off can be encoded into the BIOS software and enabled for use when the DPS receives a deletion trigger is saved.

After the deletion trigger or setting is saved in the CMOS or other memory, the routine 800 proceeds to step 806, wherein the DPS is powered-on either automatically as a result of the deletion trigger, another trigger, manually by an unauthorized user trying to access the flagged data, or alternatively by system reset.

At step 808, the BIOS executes and performs system initialization and POST activities. At step 810, an operating system is loaded, after which a search for flagged data can be performed as indicated by step 812. The routine 800 then proceeds to step 814, wherein it is determined if flagged data is available for deletion. If it is determined, at step 814, that flagged data is available, the routine 800 proceeds to step 816 and the data is deleted. The operating system resumes normal operation at step 818 and the routine 800 ends at step 820.

If it is determined, at step 814, that no flagged data is available for deletion, then the routine 800 proceeds to step 818 and the operating system resume normal operation and the routine 800 ends at step 820.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for the secure remote deletion of pre-flagged data stored within a data processing system, the method comprising the steps of:

executing a flag routine, including:
  (i) receiving a flag, initiated by a user of the data processing system, of at least one datum for possible future deletion; and
  (ii) storing the datum in a memory of the data processing system in a manner indicating that the datum is to be deleted in response to execution of a data deletion routine, wherein the manner of indicating that the datum is to be deleted in response to execution of the data deletion routine includes a procedure selected from a group of procedures consisting of:
    (a) storing the datum in a special memory portion of the memory of the data processing system dedicated to storing only data indicated as datum to possibly be deleted in the future in response to execution of the data deletion routine;
    (b) storing the datum in the memory of the data processing system as a special file type, wherein the file type indicates that the datum may possibly be deleted in the future in response to execution of the data deletion routine;
    (c) storing the datum in a specific folder of the memory of the data processing system dedicated to storing only data that may possibly be deleted in the future in response to execution of the data deletion routine; and
    (d) storing the datum in the memory of the data processing system with an indication indicating that the datum may possibly be deleted in the future in response to execution of the data deletion routine;

receiving a deletion trigger initiated by the user of the data processing system;

executing an authorization routine authorizing remote deletion of the at least one flagged datum; and executing the data deletion routine in response to receiving the deletion trigger from the user of the data processing system, and if remote deletion is authorized, the data deletion routine deleting the at least one flagged datum.

2. The method of claim 1, wherein executing the flag routine comprises receiving the flag having been initiated by the user pressing at least one key of the data processing system to flag the at least one datum.

3. The method of claim 1, wherein the data deletion routine deletes the at least one flagged datum following powering on the data processing system and prior to an operating system load sequence initiated in response to the powering on of the data processing system.

4. The method of claim 1, wherein the data deletion routine deletes the at least one flagged datum following powering on the data processing system and during an operating system load sequence initiated in response to the powering on of the data processing system.

5. The method of claim 1, wherein the data deletion routine deletes the at least one flagged datum following powering on the data processing system and after an operating system load sequence initiated in response to the powering on of the data processing system.

6. The method of claim 1, wherein receiving the deletion trigger initiated by the user of the data processing system includes receiving the deletion trigger from a device remote to the data processing system.

7. The method of claim 6, wherein the user initiates the trigger via one of a telephone call to an authentication center remote to the data processing system and a web site operated by the authentication center.

8. The method of claim 6, wherein receiving the deletion trigger includes receiving the deletion trigger via an authorization center remote to the data processing system.

9. The method of claim 8, receiving the deletion trigger via the authorization center includes the data processing system receiving the trigger by a mode selected from a group of modes consisting of:
   a call to the data processing system;
   a message sent to the data processing system; and
   an Internet Protocol (IP) session with the data processing system.

10. The method of claim 1, wherein receiving the deletion trigger includes receiving a key transmitted to the data processing system from an authentication center remote to the data processing system.

11. A non-transitory computer-readable medium comprising computer-executable instructions which, when executed by a processor, cause the processor to:
   execute a flag routine including:
     (i) receiving a flag, initiated by a user of a data processing system, of at least one datum for possible future deletion; and
     (ii) storing the datum in a memory of the data processing system in a manner indicating that the datum is to be deleted in response to execution of a data deletion routine, wherein the manner of indicating that the datum is to be deleted in response to execution of the data deletion routine includes a procedure selected from a group of procedures consisting of:
       (a) storing the datum in a special memory portion of the memory of the data processing system dedicated to storing only data indicated as data to possibly be deleted in the future in response to execution of the data deletion routine;
       (b) storing the datum in the memory of the data processing system as a special file type, wherein the file type indicates that the datum may possibly be deleted in the future in response to execution of the data deletion routine;
       (c) storing the datum in a specific folder of the memory of the data processing system dedicated to storing only data indicated as data to possibly be deleted in the future in response to execution of the data deletion routine; and
       (d) storing the datum in the memory of the data processing system with an indication indicating that the datum may possibly be deleted in the future in response to execution of the data deletion routine:
   receive a deletion trigger initiated by the user of the data processing system;
   execute an authorization routine authorizing remote deletion of the at least one flagged datum; and
   execute a data deletion routine in response to receiving the deletion trigger from the user of the data processing system, and if remote deletion is authorized, the data deletion routine deleting the at least one flagged datum.

12. The computer-readable medium of claim 11, wherein the computer-executable instructions, when executed by the processor, further cause the processor to, in executing the flag routine, receive the flag having been initiated by the user pressing at least one key of the data processing system to flag the at least one datum.

13. The computer-readable medium of claim 11, wherein the computer-executable instructions, when executed by the processor, further cause the processor to, in executing the data deletion routine, delete the at least one flagged datum, in relation to an operating system load sequence:
   prior to the operating system load sequence;
   during the operating system load sequence; or
   after the operating system load sequence.

14. The computer-readable medium of claim 11, wherein the computer-executable instructions, when executed by the processor, further cause the processor to, in receiving a deletion trigger initiated by the user of the data processing system, receive a key transmitted to the data processing system from an authentication center remote to the data processing system.

15. A data processing system configured to facilitate secure remote deletion of pre-flagged data, the system comprising:
   a computer-readable medium having instructions for facilitating secure deletion of data from the data processing system;
   a processor operable to execute the instructions to:
     execute a flag routine, including:
       (i) receiving a flag, initiated by a user of the data processing system, of at least one datum for possible future deletion; and
       (ii) storing the datum in a memory of the data processing system in a manner indicating that the datum is to be deleted in response to execution of a data deletion routine, wherein the manner of indicating that the datum is to be deleted in response to execution of the data deletion routine includes a procedure selected from a group of procedures consisting of:
         (a) storing the datum in a special memory portion of the memory of the data processing system dedicated to storing only data indicated as data to possibly be deleted in the future;
         (b) storing the datum in the memory of the data processing system as a special file type, wherein the file type indicates that the datum may possibly be deleted in the future;

(c) storing the datum in a specific folder of the memory of the data processing system dedicated to storing only data that may possibly be deleted in the future; and (d) storing the datum in the memory of the data processing system with an indication indicating that the datum may possibly be deleted in the future;

receive a deletion trigger initiated by the user of the data processing system;

execute an authorization routine authorizing deletion of the at least one flagged datum, and execute the data deletion routine, to delete the at least one flagged datum, in response to receiving the deletion trigger initiated by the user of the data processing system and if the deletion is authorized;

a transceiver, the transceiver configured to receive a signal including the data deletion trigger.

16. The data processing system of claim 15, wherein the processor, in being configured to execute the flag routine, is configured to receive the flag having been initiated by the user pressing at least one key of the data processing system to flag the at least one datum.

17. The data processing system of claim 15, wherein the processor, in being configured to execute the data deletion routine, is configured to delete the at least one flagged datum, in relation to an operating system load sequence:
  prior to the operating system load sequence;
  during the operating system load sequence; or
  after the operating system load sequence.

18. The data processing system of claim 15, wherein the processor, in being configured to receive a deletion trigger initiated by the user of the data processing system, is configured to receiving a key transmitted to the data processing system from an authentication center remote to the data processing system.

* * * * *